United States Patent [19]
Reimers

[11] 3,978,970
[45] Sept. 7, 1976

[54] LOADER FOR CONTAINERIZED COOKER

[75] Inventor: James L. Reimers, Saratoga, Calif.

[73] Assignee: FMC Corporation, San Jose, Calif.

[22] Filed: Apr. 25, 1974

[21] Appl. No.: 464,283

[52] U.S. Cl. ............................. 198/425; 198/429; 214/1 BB; 214/6 N; 214/6 M; 214/10.5 R; 198/646; 198/633
[51] Int. Cl.² ........................................ B65G 47/00
[58] Field of Search ........... 198/235, 24, 30, 31 AB, 198/154, 158, 31 R, 106, 127, 22 B; 214/1 BB, 6 P, 6 H, 10.5 R, 6 N, 6 M; 134/66, 67, 70, 133, 134, 147, 148, 22 R, 22 B, 34; 53/61, 176, 157, 159

[56] References Cited
UNITED STATES PATENTS

| | | | |
|---|---|---|---|
| 2,949,179 | 8/1960 | Busse | 214/6 N |
| 3,543,949 | 12/1970 | Weier | 214/1 BB |
| 3,570,685 | 3/1971 | Carlson | 214/6 N |
| 3,612,299 | 10/1971 | Shaw | 214/6 P |
| 3,650,375 | 3/1972 | Fleischauer et al. | 198/127 R |
| 3,664,087 | 5/1972 | Choate et al. | 198/30 |
| 3,788,497 | 1/1974 | Carlson | 198/24 |

Primary Examiner—Robert J. Spar
Assistant Examiner—James M. Slattery
Attorney, Agent, or Firm—C. E. Tripp; R. B. Catto

[57] ABSTRACT

A live roll conveyor receives randomly supplied upstanding containers, such as cans, and arrests the leading cans with a pattern stop bar having pockets that arrange a transverse row of cans to receive a next assembled row of cans in nesting relation. When a backlog of alternately offset rows of cans extends upstream of an overhead clamp spaced from the pattern bar, the clamp locks two rows of containers to hold back the further upstream containers, and the pattern stop moves downstream so that one assembled charge of nested containers is moved unitarily downstream by the live rolls. A separator or retaining plate with downturned edge flanges is placed on the charge of cans, the pattern stop is further retracted to expose an underlying guide bar and allow the charge to seat against the guide bar, a gate is lowered to allow lateral discharge of the charge of cans, and a sweep arm pushes the charge to a laterally adjacent container basket of a containerized cooker. By changing the pattern bar and making certain adjustments, a different size of container can be accommodated.

7 Claims, 22 Drawing Figures

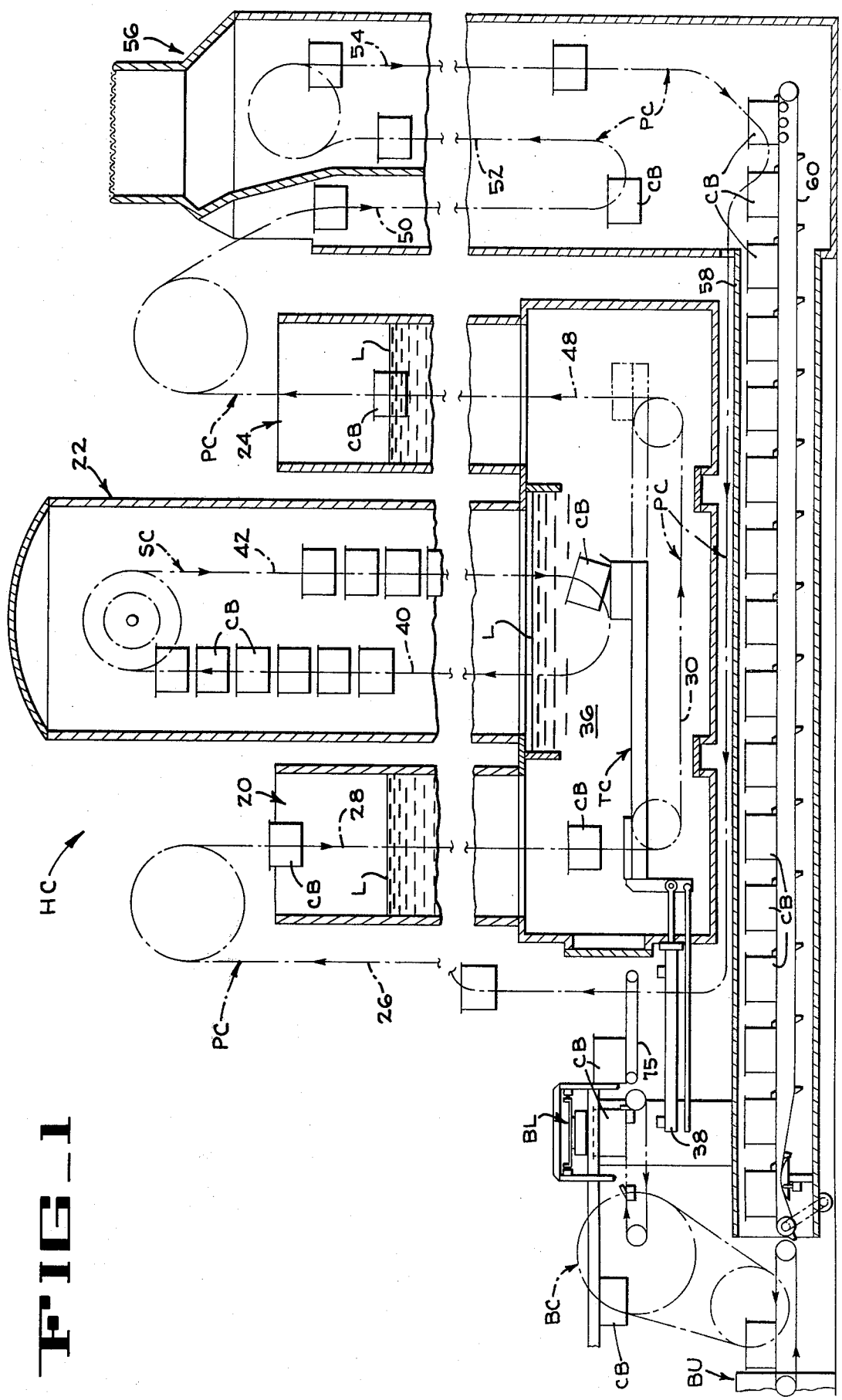
FIG_1

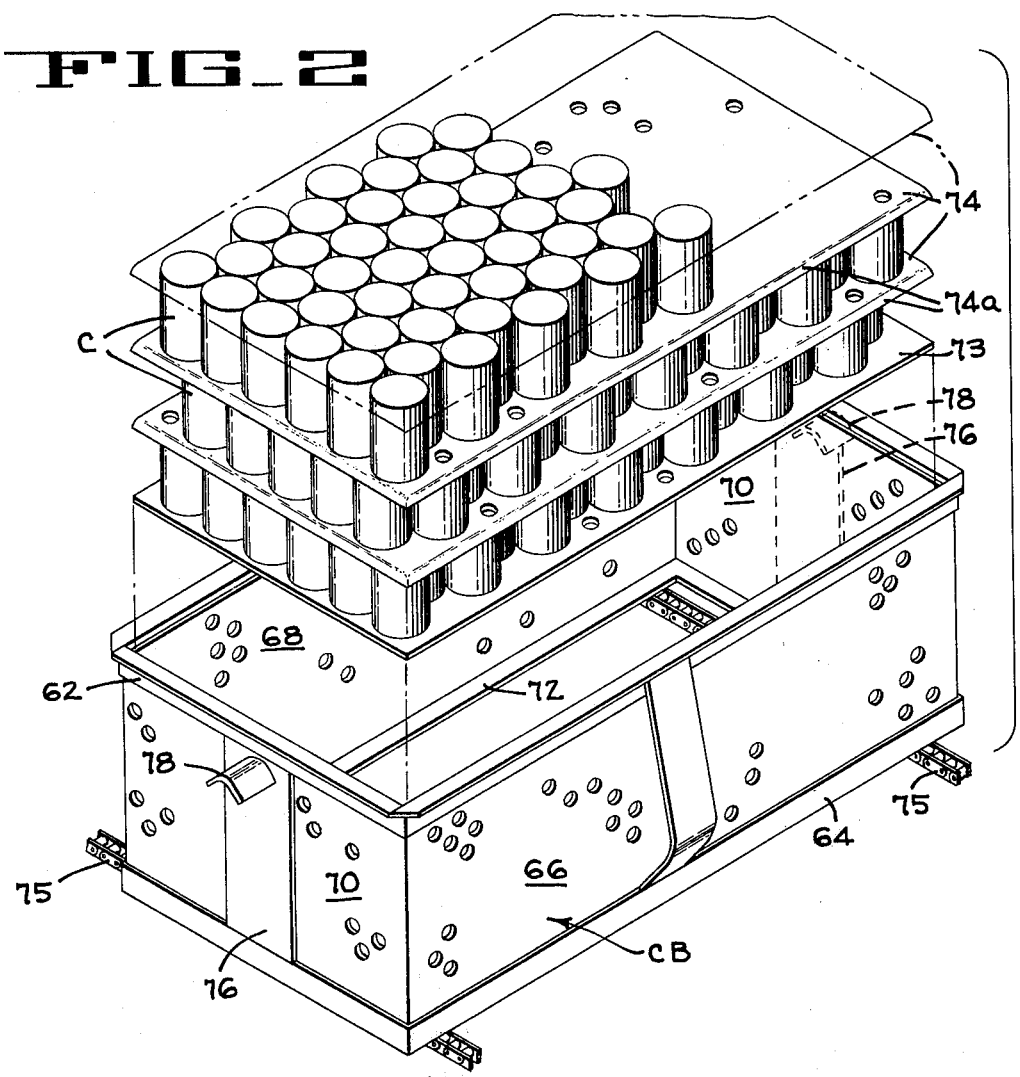
FIG_2
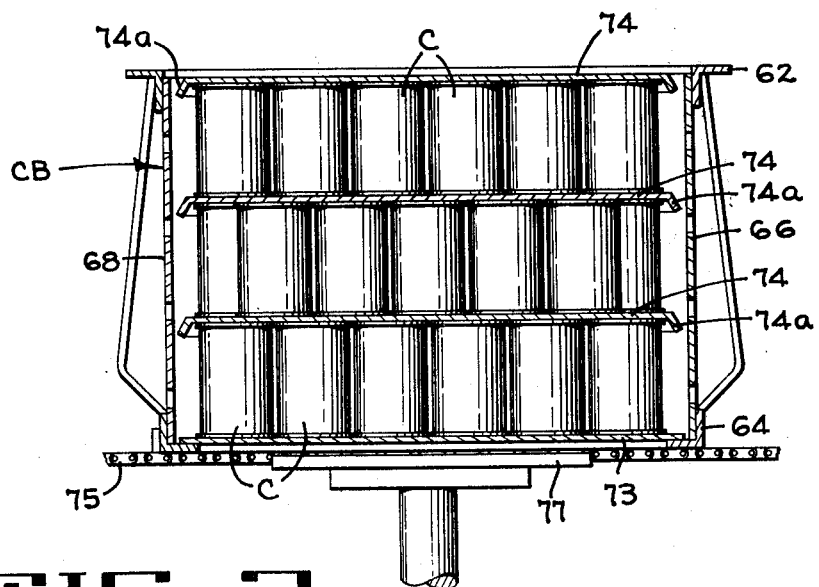
FIG_3

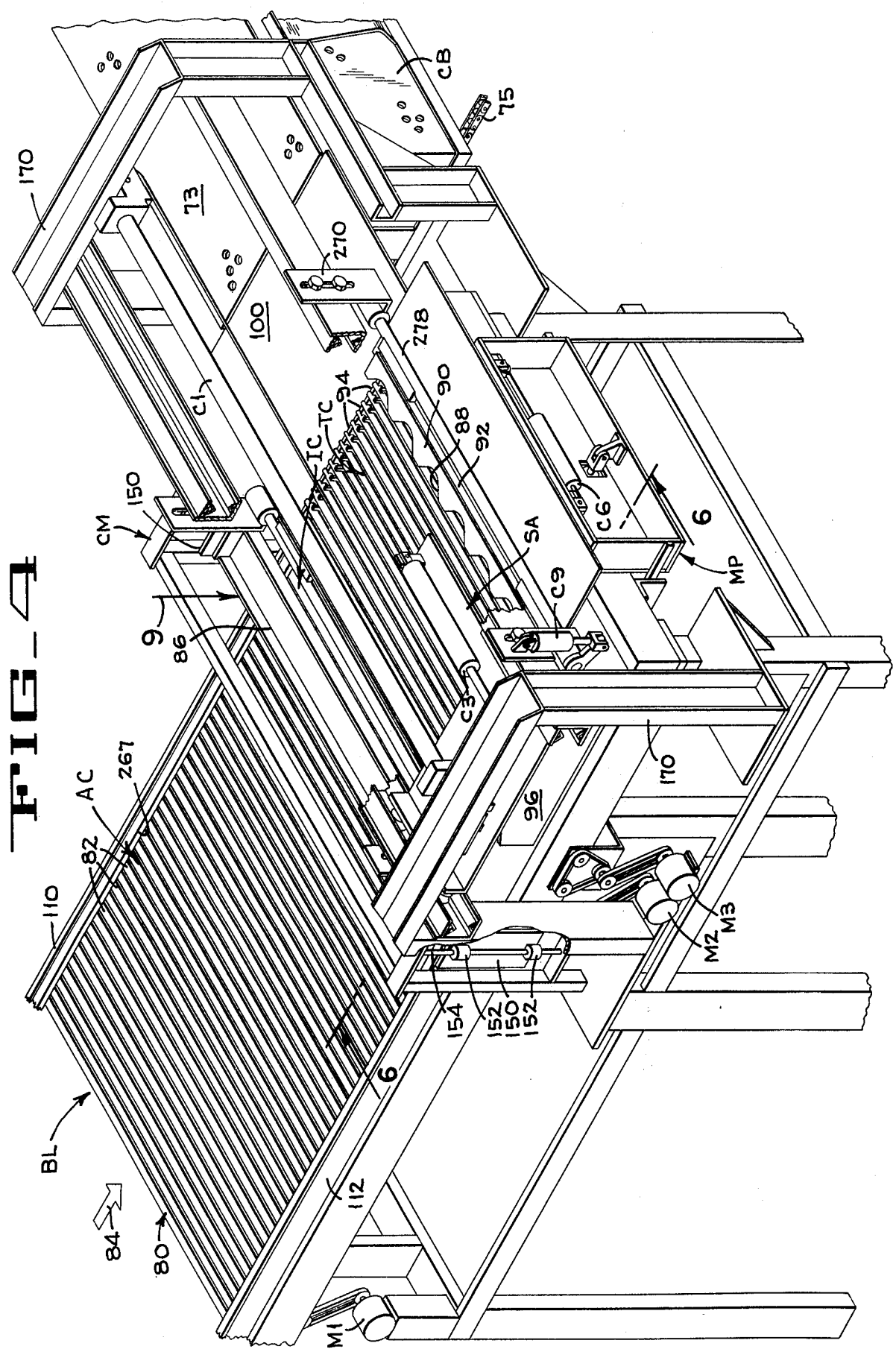

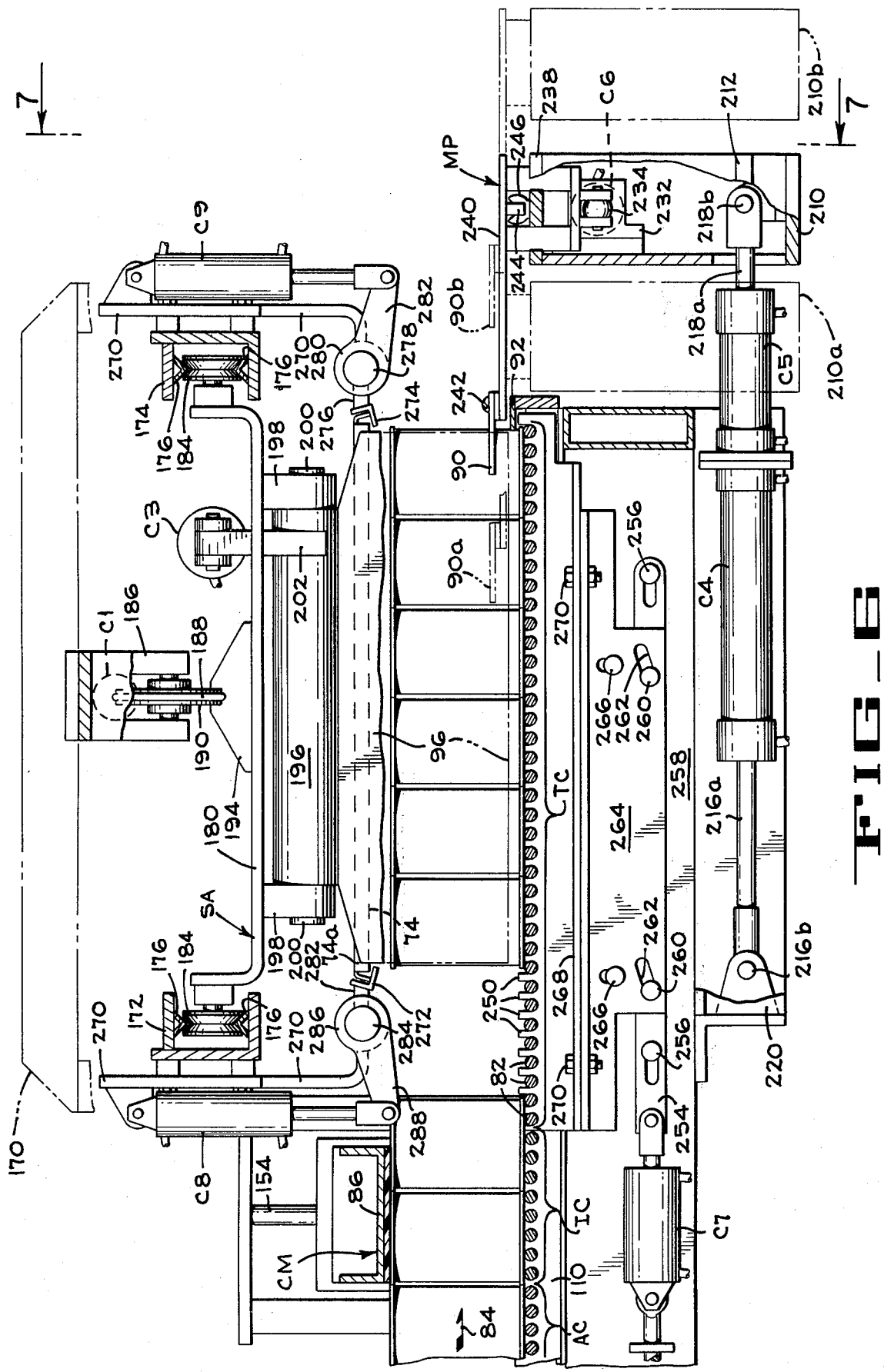
FIG_6

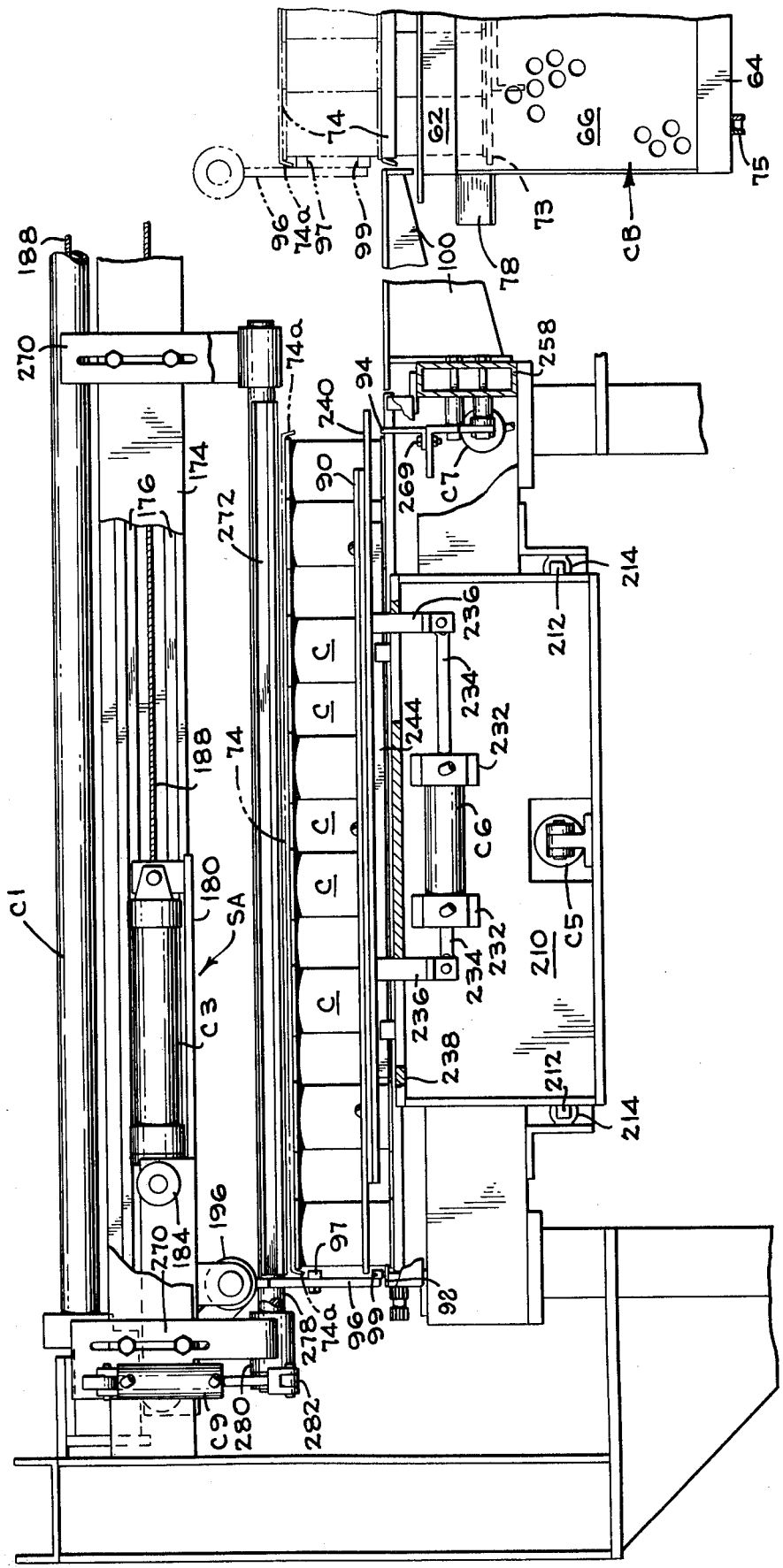

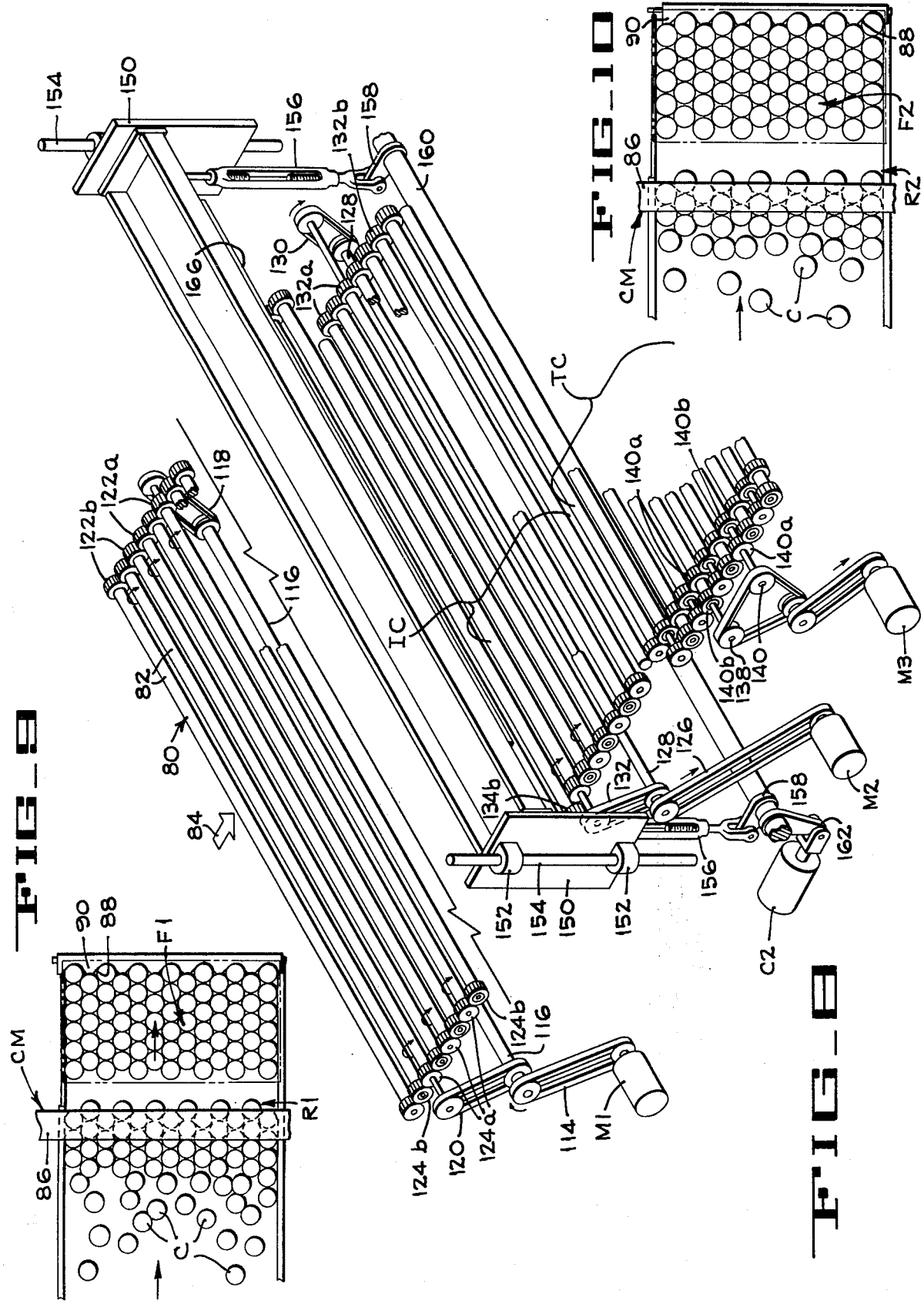

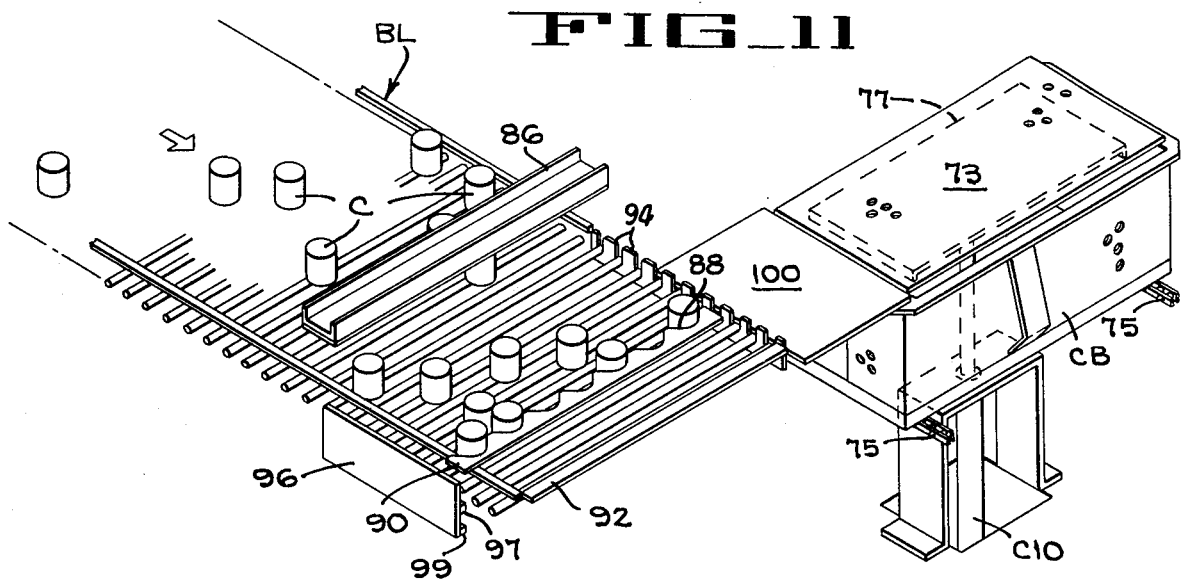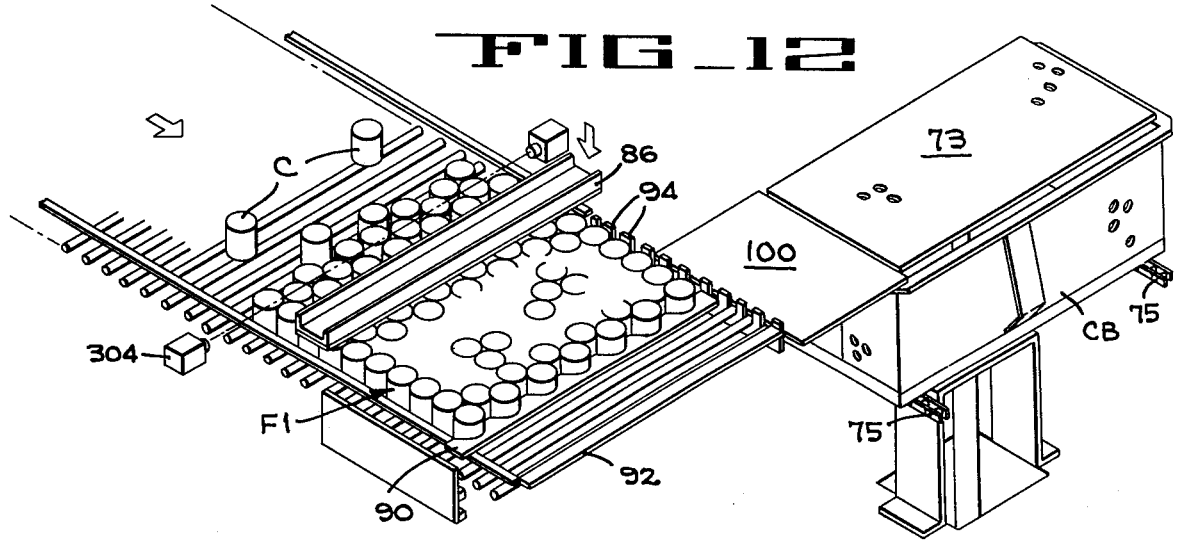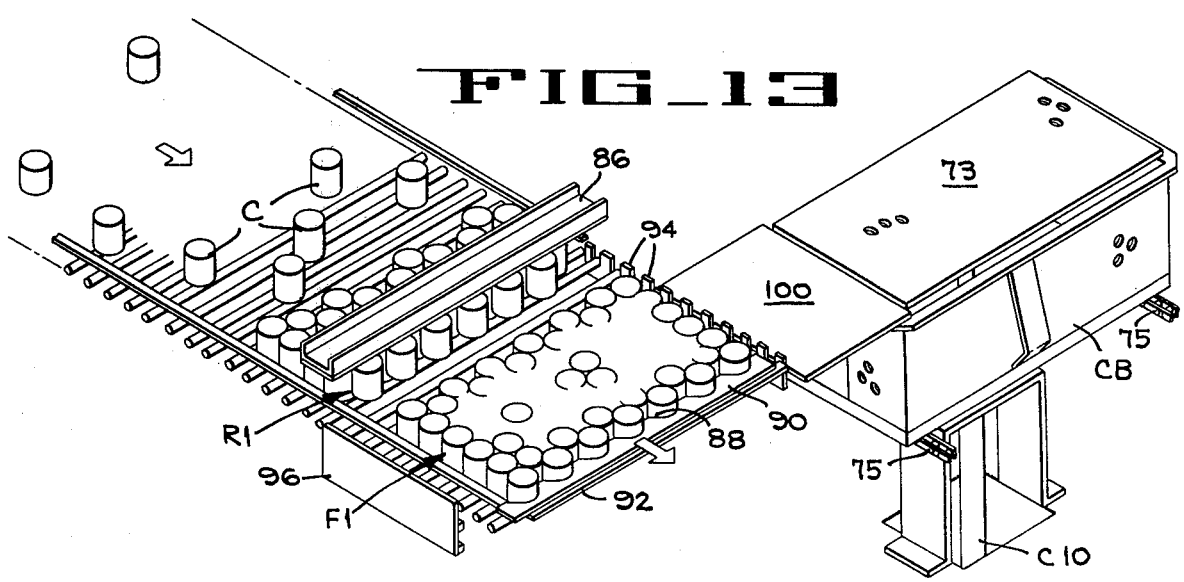

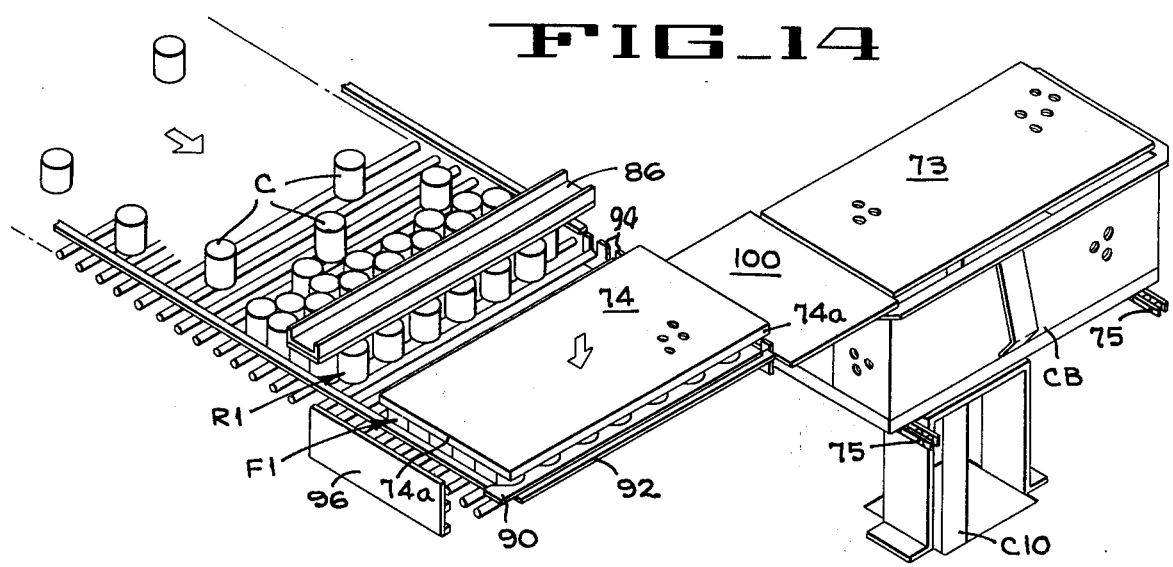
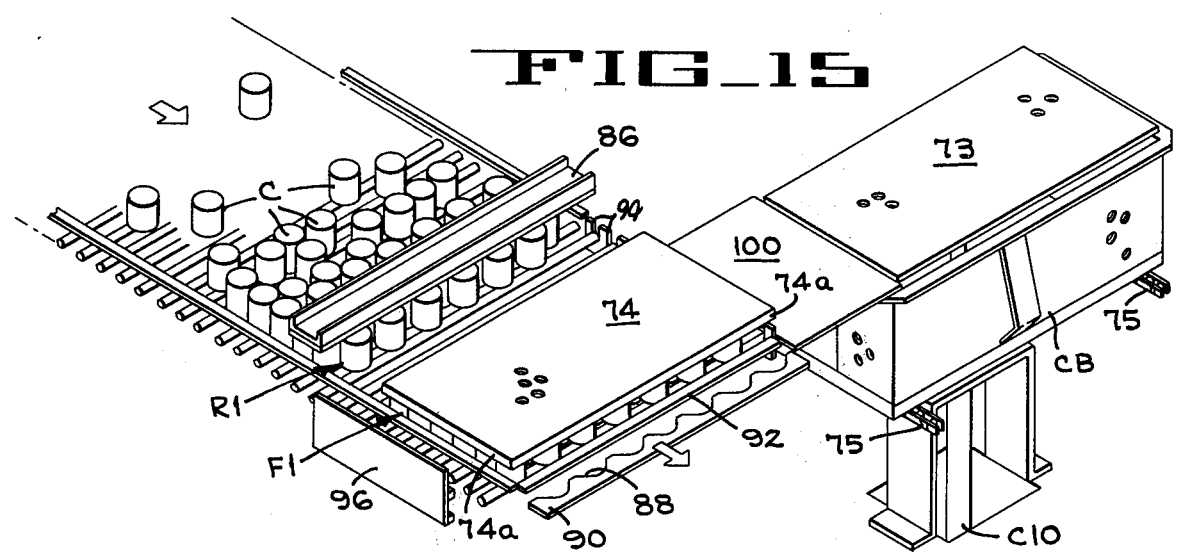
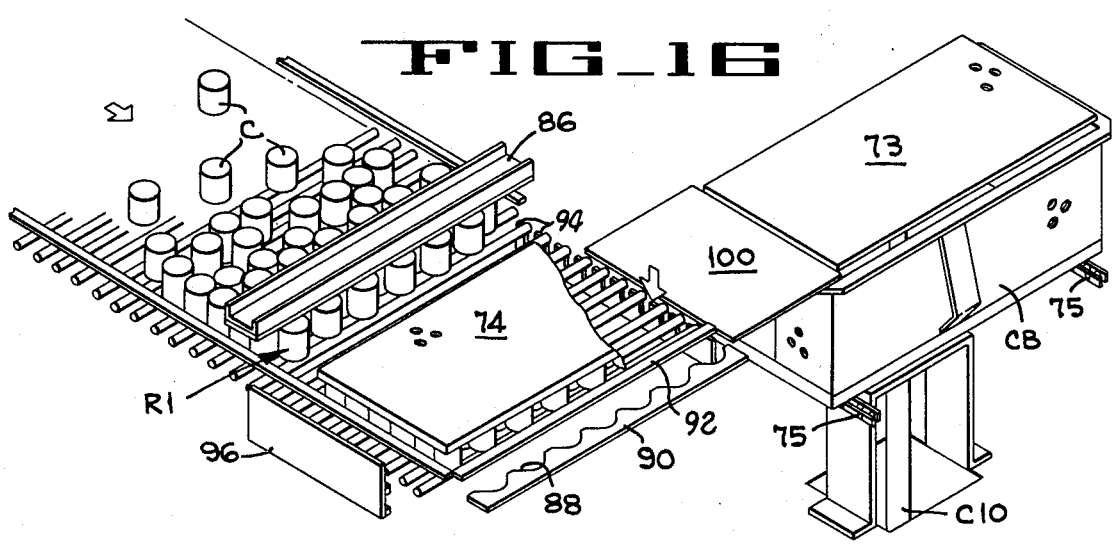

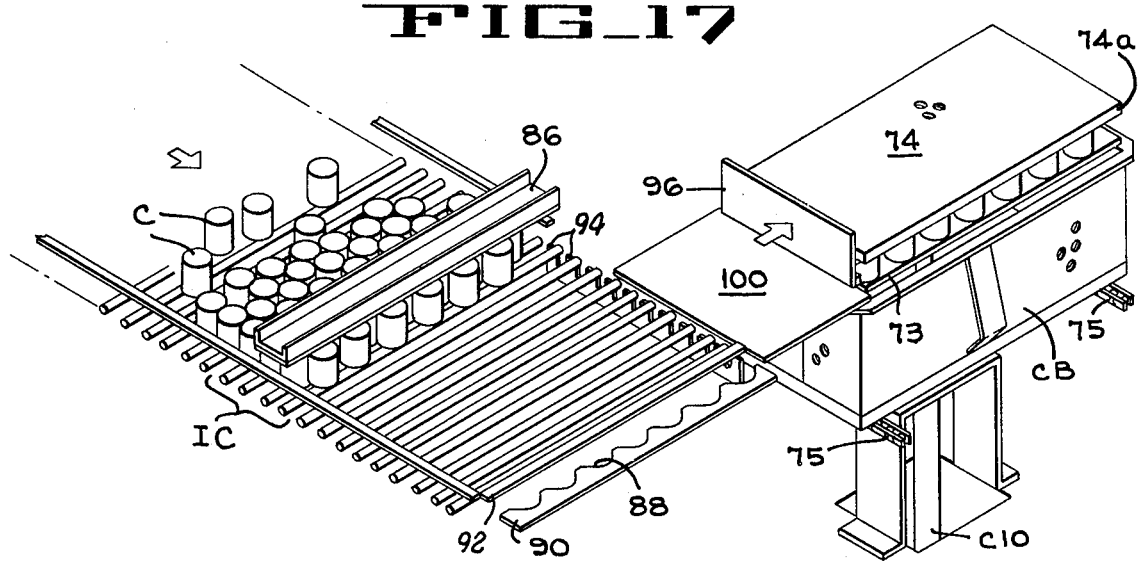
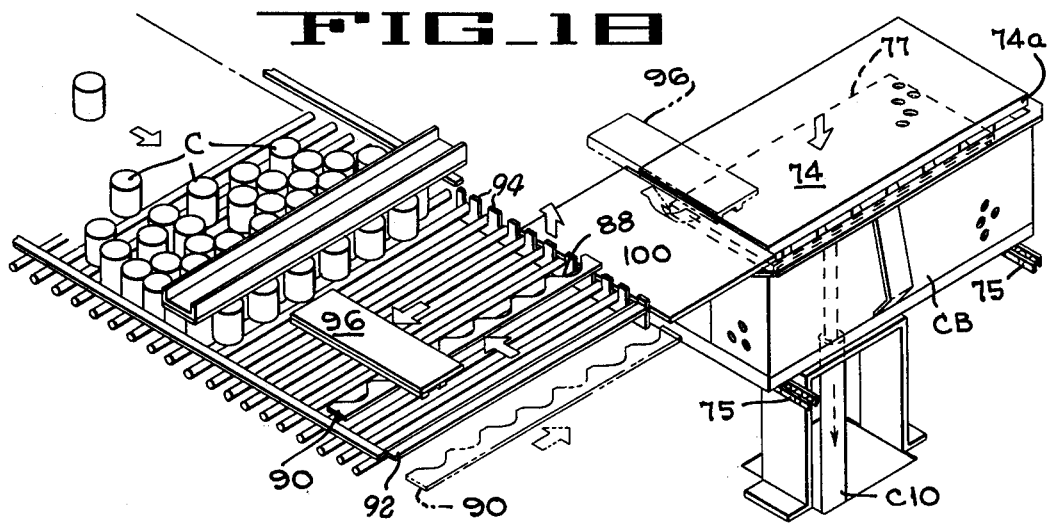
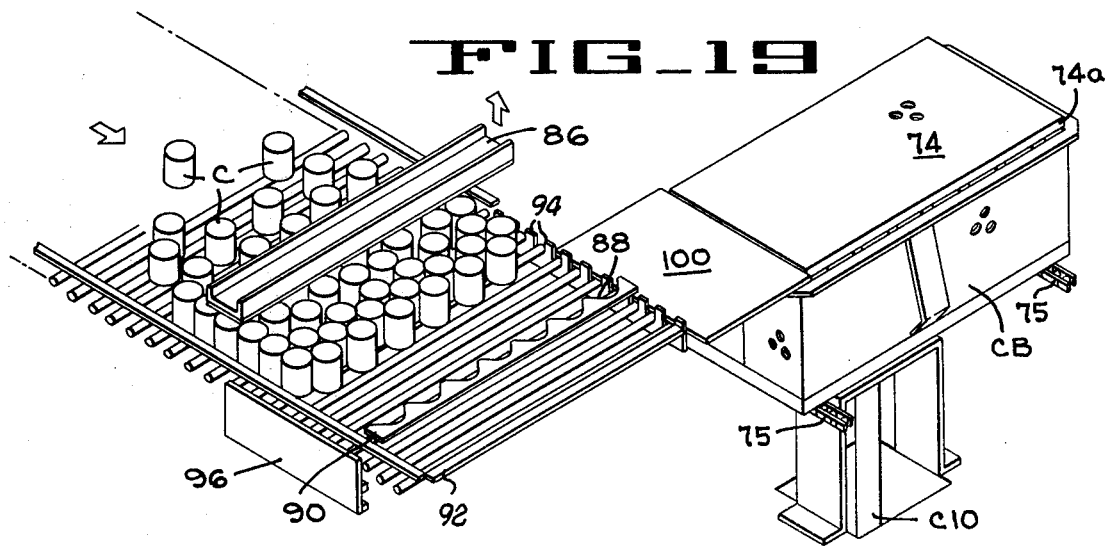

FIG_20

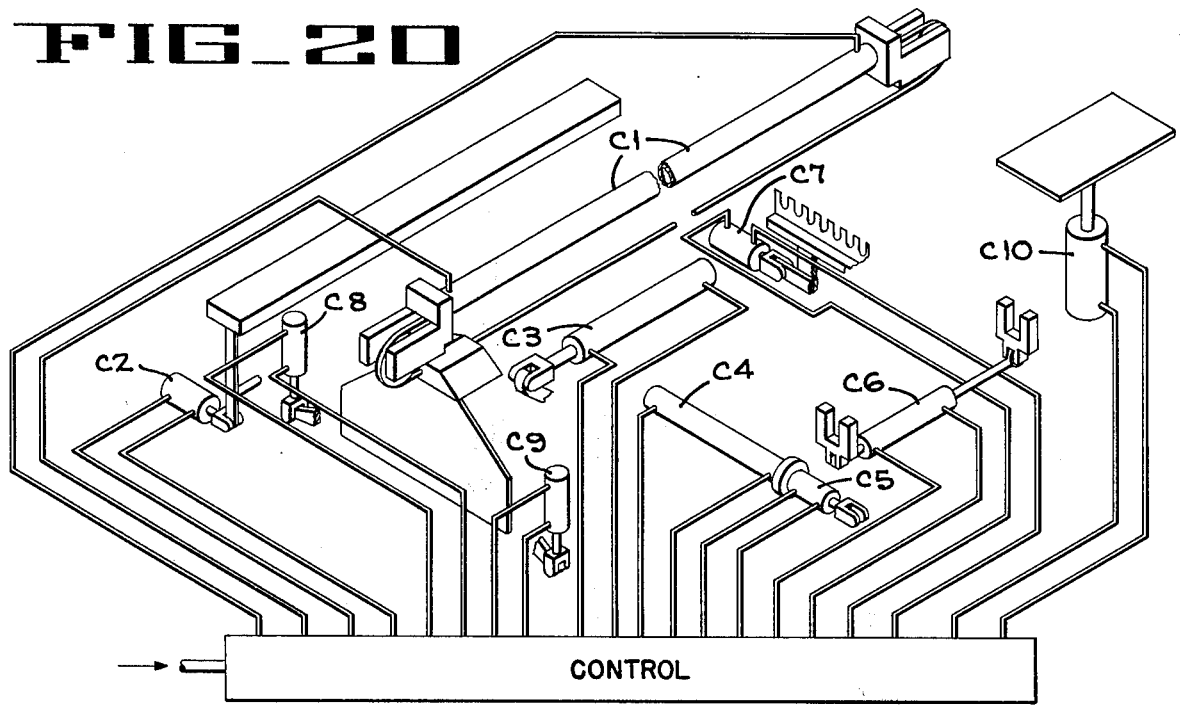

|  | FUNCTION | CONTROL |
|---|---|---|
| FIGURE 11 | RAISE FALSE BOTTOM 73<br>RETRACT PATTERN BAR 90 UPSTREAM<br>ERECT PUSHER PLATE 96<br>RETRACT PUSHER PLATE 96<br>RAISE GATE 94<br>RAISE CLAMP BAR 86<br>DRIVE CONVEYOR ROLLS 82 | EXTEND C10<br>RETRACT C4 AND C5<br>EXTEND C3<br>ACTUATE C1<br>RETRACT C7<br>RETRACT C2<br>ENERGIZE M1, M2 & M3 |
| FIGURE 12 | SENSE CANS UPSTREAM OF CLAMP BAR 82<br>STOP AIR MOTOR M2 AND CONVEYOR IC<br>LOWER CLAMP BAR 86 | PHOTOCELL 304<br><br>EXTEND C2 |
| FIGURE 13 | SHIFT PATTERN BAR 90 DOWNSTREAM | EXTEND C4 |
| FIGURE 14 | PLACE SEPARATOR PLATE ON FILLING CHARGE | RETRACT C8 AND C9 |
| FIGURE 15 | SHIFT PATTERN BAR 90 CLEAR OF FILLING CHARGE | EXTEND C5 |
| FIGURE 16 | LOWER GATE 94 | EXTEND C7 |
| FIGURE 17 | EJECT FILLING CHARGE F1 | ACTUATE C1 |
| FIGURE 18 | RAISE GATE 94<br>LOWER FILLING CHARGE IN BASKET CB<br>SWING PUSHER PLATE 96 UPWARD<br>SHIFT PATTERN BAR 90 ENDWISE<br>RETRACT PATTERN BAR 90 UPSTREAM | RETRACT C7<br>RETRACT C10<br>RETRACT C3<br>ACTUATE C6<br>RETRACT C4 AND C5 |
| FIGURE 19 | ERECT PUSHER PLATE 96 | EXTEND C3 |

FIG_21

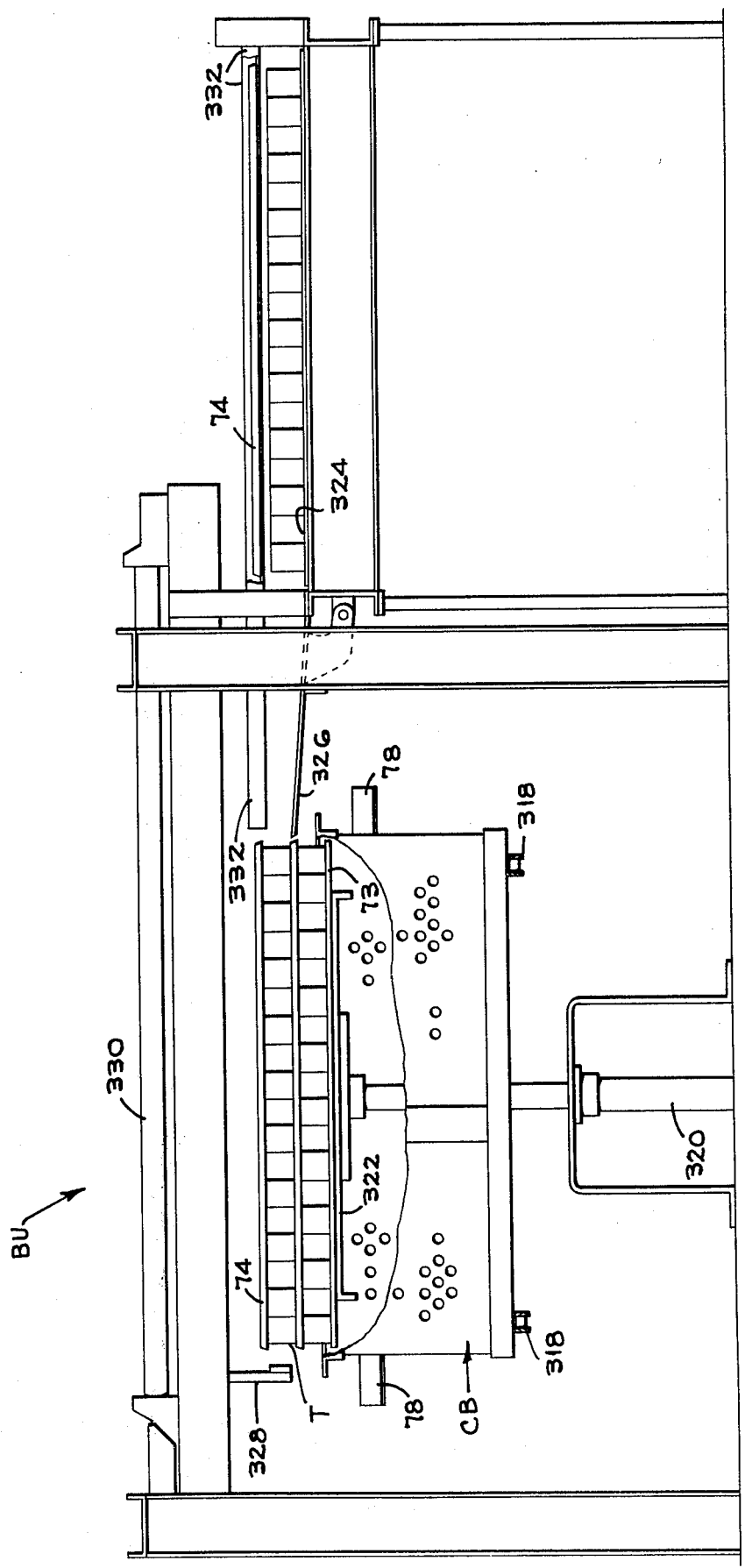
FIG_22

LOADER FOR CONTAINERIZED COOKER

CROSS REFERENCES TO RELATED APPLICATIONS

The present invention concerns a basket loading apparatus having particular utility with a containerized hydrostatic sterilizing system, such as the system disclosed in the pending United States patent application of James L. Reimers et al., Ser. No. 400,997, filed Sept. 26, 1973, now U.S. Pat. No. 3,927,976, and having a common assignee with this application. The pending application schematically discloses a known type of loading system wherein randomly supplied upstanding containers are assembled into a nested tier which is then transferred to a container or basket. When the basket has been loaded with a predetermined number of tiers of containers, the tiers being separated by perforate separator plates, the basket is transferred to the carrier chains of the sterilizer, and the basket progresses through an inlet water-leg, a processing leg, and an outlet water-leg for heat treating the contents of the containers. The present basket loading apparatus performs similar functions, but has special provisions to minimize damage to the containers, and special provisions for handling containers in a wide range of sizes.

BACKGROUND OF THE INVENTION

1. Field of the Invention

The present invention concerns hydrostatic sterilizers or cookers, and more particularly is directed to apparatus for assembling randomly fed incoming containers into a nested pattern forming one tier, and for loading successively formed tiers into a container carrier or basket which is then transported through the sterilizer to heat-treat the contents of the containers.

2. Description of the Prior Art

The United States patent of Busse, U.S. Pat. No. 2,506,661, issued May 9, 1950, discloses apparatus for loading cans in conjunction with a false-bottom retort crate or basket. The false-bottom plate is elevated within the retort to receive a single file or containers and is tilted to facilitate movement of the containers into a tier substantially the area of the bottom plate. Then, a separator plate is placed on the tier, and the bottom plate is lowered within the retort so that the next layer of containers is placed on the separator plate, and so forth until the retort is filled. This apparatus is relatively slow in operation due to the single file feeding mode, and subjects the containers to considerable handling impacts which can damage or detroy them. The apparatus is not considered to be economically feasible for loading the container baskets of presently used hydrostatic cookers and sterilizers, due to the large capacity and relatively high speed operation of the latter.

One of the foremost commercial disadvantages which is common to container handling and pattern forming mechanisms, such as the Busse device, is that the containers are easily damaged when subjected to mechanical handling, particularly with the aluminum cans and glass containers now in wide use. Some can handling devices, such as pallet loaders which assemble steel cans, employ electro-magnetic lifting devices for transferring an assembled tier of cans, thus eliminating most of the can damaging hazards during the transfer operation. With non-ferrous containers, however, magnetic transfer cannot be employed, and in some prior art can handling devices a relatively high percentage of damage is inevitable because of the mechanical means employed to assemble a group of cans in nested relation to form a unitary charge for stacking or filling, and because of the mechanism necessary for moving the filling charge to a container.

Further sources of potential can damage exist in a loading device where incoming cans are arrested on a continuously moving conveying surface to separate the upstream cans from an assembled charge of cans because the conveying surface abrades the arrested cans. This arrangement also inhibits lateral discharge of the assembled can charge where that mode of operation is required. Further, it is common to have the assembled charge of cans closely confined by fixed and/or movable guides while the charge is moved to alignment with the receiving receptacle in order to retain their assembled pattern, so the possibility of can damage exists until the charge is deposited into the receptacle. After the can tiers are deposited in the receptacle with a planar separator panel between adjacent layers, they become partially buoyant in the sterilizer so that the cans at the perimeter of the can charge repeatedly contact the walls of the receptacle and are thus often damaged.

In addition to the Busse patent, supra, other patents of general interest relative to certain individual details of the present loading device are: Tomkins U.S. Pat. No. 2,571,790, issued Oct. 16, 1951, discloses a can arranging apparatus for forming a tier of empty cans in nested relation, and includes an overhead rotor for controlling the movement of selected cans to stagger and nest the adjacent rows of cans.

In the Socke et al. U.S. Pat. No. 2,524,846, issued on Oct. 10, 1950, already assembled tiers of cans are stacked in a bag by apparatus which also places a planar separator panel between adjacent tiers. Each tier is transferred by a vacuum gripping apparatus which engages the upper end of each can. In a later Socke U.S. Pat. No. 2,619,237, issued on Nov. 25, 1952, spaced and staggered rows of cans are transferred as a group to a compacting station where the group is enclosed on three sides and compacted by a pusher that engages the remaining side.

O'Neil U.S. Pat. No. 2,718,313, issued on Sept. 20, 1955, discloses a magazine which deposits a charge of containers, having rows aligned in both directions, onto a plunger which lowers the charge into a chamber where every other row of cans is mechanically shifted so that the assembled groups of cans are nested for packaging or storing.

Bainbridge U.S. Pat. No. 2,959,009, issued on Oct. 28, 1958, discloses a can palletizing machine which includes a pattern forming mechanism for assembling a nested tier of cans. For this purpose, the patentee employs a continuously moving planar conveying surface, and an overhead pattern former having depending pins to arrest a transverse row of incoming cans. All incoming cans are thus retared while the conveyor continues to urge the cans toward the arrested row, the result of which is that the cans seek nested positions so that an assembled group is formed with the transverse rows staggered and nested. The probability of can damage is relatively high because of the coextensive contact of the bottoms of the cans on the conveying surface, and because the overhead pattern forming pins must enter small gaps, between adjacent cans, that only exist if the impositive nesting operation occurs without malfunction.

A machine for stacking cans on pallets is disclosed in the Busse U.S. Pat. No. 2,949,179, issued on Aug. 16, 1960. In the patented machine, longitudinal lane dividers over a conveying surface guide rows of cans to a pattern forming station where a group of nested cans are assembled for subsequent transfer onto a pallet. In order to nest the cans, a complete transverse row of aligned cans is clamped by individual overhead clamps against a stationary support plate. Then, every other longitudinal row of cans of the group thus separated is stopped by an individual stop in front of the leading can, with the result that a nested pattern of assembled cans is formed. After the lane dividers are lifted, a sweep arm pushes the assembled cans unitarily toward the laterally adjacent pallet. In order to retain the pattern of the assembled group of cans, the sweep is of U-shape to embrace three sides of the group. The patented device is considered to be relatively complex in that it requires several compound motions to place various mechanisms into and out of the can paths to prevent interference with other movable parts. This patent and the previously mentioned Busse U.S. Pat. No. 2,506,661 have several structural parts which are similar to those in applicant's improved loader, but lack the basic concept and certain structural features of applicant's mechanism, as will presently be explained. One important object of the present invention, and lacking in the prior art above discussed, is to provide means, apart from the loader, for controlling the assembled, nested group of cans during the transfer or loading operation, and for preventing the cans from later contacting the walls of the container basket into which they are loaded for processing in a hydrostatic sterilizer.

SUMMARY OF THE INVENTION

By providing a live roll conveying surface and a movable pattern forming bar or stop extending across the end of the conveying surface, the continuous dynamic friction with only minimal line-contact between the live rolls and the cans allows the cans to readily move laterally as well as longitudinally, so that they quickly seat against a scalloped edge of the pattern bar. Subsequent cans quickly attain nested interrelation, and build up a backlog extending upstream under a laterally extending clamp bar. Certain of the live rolls under the clamp bar are capable of being stopped, and the clamp bar descends to simultaneously arrest two staggered rows to stop those cans and all cans upstream.

The pattern bar then moves downstream to isolate the charge of nested cans, and a separator plate of special configuration is placed on the assembled can charge to thereafter lock them together for unitary movement into an adjacent container basket for a hydrostatic sterilizer. Due to the coaction of the special separator plate and the live roll conveyor, only one guide bar is required to give directional control to the can charge as a sweep arm or pusher ejects the can charge laterally to the container basket.

A feature of the present invention is that the separator plate has downturned edge flanges to lock the charge of cans together, as mentioned. With this arrangement, and by using different pattern bars, many different sizes of cans may be handled because the separator plate keeps the charge of containers in assembled relation, and within the confines of a rectangular area which approximates the inside dimensions of the container basket. The same previously noted advantage afforded by the special separator plate of preventing the buoyant cans from impacting the inside walls of the container baskets during the sterilizing operation is common to all sizes of cans which the loading apparatus can handle.

BRIEF DESCRIPTION OF THE DRAWINGS

FIG. 1 is a schematic section of a hydrostatic sterilizer employing carrier baskets which are loaded with tiers of containers by the loading apparatus of the present invention.

FIG. 2 is an exploded schematic perspective of a typical container basket with container tiers and intermediate separator or retainer plates in accordance with the present invention.

FIG. 3 is a schematic transverse section of a loaded container basket in loading position.

FIG. 4 is a schematic perspective of the overall loading apparatus of the present invention.

FIG. 6 is an enlarged schematic longitudinal section taken along lines 6—6 on FIG. 4.

FIG. 7 is a section, partly broken away and slightly reduced in scale, taken in the direction of the arrows 7—7 on FIG. 6.

FIG. 8 is a fragmentary isometric, slightly enlarged, of the conveyor rolls and drive shown in FIG. 4.

FIGS. 9 and 10 are schematic, fragmentary plan views of the zone indicated by the arrow 9 on FIG. 4, and illustrate operating conditions with two different container sizes.

FIGS. 11-19 are schematic perpsectives, similar to FIG. 4, showing successive operational steps in assembling containers into tiers and loading the tiers into a container basket for processing in the hydrostatic sterilizer of FIG. 1.

FIG. 20 is a schematic perspective showing the various air cylinders for operating the basket loader components, with the cylinders oriented substantially the same as in FIG. 4.

FIG. 21 is a chart indicating the operating sequence of the air cylinders and their functions.

FIG. 22 is a schematic and elevation of a container basket unloading apparatus.

DESCRIPTION OF THE PREFERRED EMBODIMENT

General Organization

Figure 5:
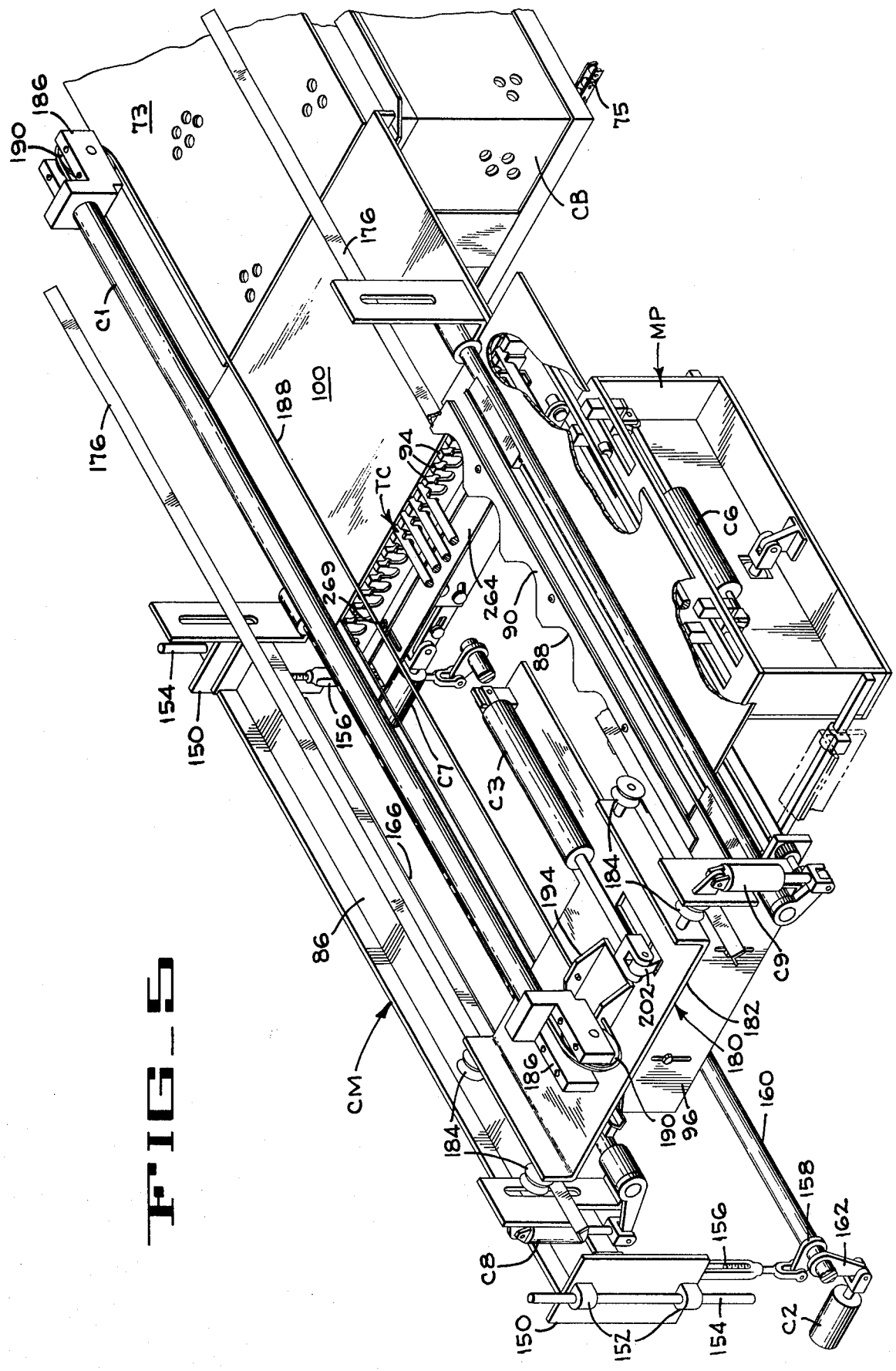
FIG. 5 is an enlarged schematic perspective of some of the major operating components of the loader shown in FIG. 4, with the same orientation.

With reference to FIG. 1, the basket loader BL of the present invention is shown in association with a hydrostatic cooker or sterilizer HC, including an inlet water leg 20, a steam processing leg 22, and an outlet water leg 24. The hydrostatic cooker HC is disclosed in my copending application Ser. No. 400,997, filed Sept. 26, 1973, and is included in the present disclosure to indicate the general type of hydrostatic cooker with which the basket loader BL may be cooperatively associated.

Filled containers, such as glass jars or cans, are automatically assembled into carrier baskets CB by the basket loader BL at the inlet zone of the cooker. Each carrier basket CB, containing as many as several hundred containers, depending upon their size, proceeds from the basket loader BL onto two parallel ascending reaches 26 of an endless primary carrier chain PC. Two parallel descending reaches 28 of the same chain PC extend downward through the inlet water leg 20, and extend with horizontal reaches 30 through a chamber 36 that interconnects the legs 20, 22 and 24, and the reaches 30 also extend under a horizontally reciprocable transfer carriage assembly TC.

A cooking medium, such as steam, or steam and air, is supplied to the upper end of the steam processing leg 22 to pressurize and heat the leg, which depresses the intermediate water level L below the water level L in the legs 20 and 24. An externally mounted hydraulic cylinder 38 reciprocates the transfer carriage assembly TC to transfer the carrier baskets CB to and from an endless secondary chain SC, comprising two parallel ascending reaches 40, and two parallel descending reaches 42, that are located in the processing leg 22.

In order to transfer the carrier baskets CB along the various reaches of the primary and secondary conveyor chains, two carrier baskets CB are deposited upon the transfer carriage TC from the descending chain reaches 28 and 42 while the carriage is in a retracted position, and the carriage is then advanced to the phantom line position to place the same two containers in position to be picked up from the transfer carriage by the ascending chain reaches 40, and by two ascending chain reaches 48 in the outlet water leg 24. After the two carrier baskets have been picked up as mentioned, the transfer carriage TC is fully retracted to repeat the basket transfer operation.

Beyond the outlet water leg 24, the primary chain PC is provided with three pairs of reaches 50, 52 and 54 which traverse the interior of a cooling chamber 56 having means for cooling the baskets and their container loads. At the bottom, the cooling chamber 56 merges with a lateral cooling tunnel 58 which encloses a basket return conveyor 60. The carrier baskets CB from the descending chain reaches 54 are deposited upon the conveyor 60 and moved through the cooling tunnel 58 to a basket unloader BU which removes the processed containers from the carrier baskets and discharges the containers for further handling by other apparatus. The empty carrier baskets are picked up by a basket conveyor BC for delivery to the basket loader BL of the present invention, and a repetition of the handling procedures described.

Carrier Basket Construction

Each carrier basket CB (FIG. 2) includes upper and lower rectangular angle iron frames 62 and 64, which are secured to perforate front and rear walls 66 and 68, and to perforate side or end walls 70. The lower frame 64 is provided with an inturned flange 72 arranged to support a false bottom plate 73 (FIG. 3) for the carrier basket CB. In known manner, the carrier basket CB is supported for the loading operation upon chain flights 75 which extend under the bottom frame 64 with clearance for the upward movement of an elevating-lowering platform 77. As will later be described in connection with FIGS. 14–19, when an empty basket CB is in loading position, the platform 77 elevates the false bottom plate 73 to a position slightly above the upper surface of the upper frame 62, in which position the bottom plate in in lateral alignment with a tier of containers to be loaded into the basket.

The first tier of containers assembled and transferred by the basket loader BL is placed on the false bottom plate 73 with an overlying separator plate or partition 74. Thus, the platform 77 is next lowered to place the planar upper surface of the separator plate 74 in the same plane formerly occupied by the false bottom plate 73, following which the next tier of containers plus an overlying separator plate 74 is positioned as described. When the container basket CB has been fully loaded (with three tiers of containers C in the example shown in FIG. 3) the chain flights 75 carry the basket to the ascending chain reaches 26 (FIG. 1).

To detachably suspend the carrier basket CB from the primary and secondary carrier chains PC and SC, a reinforcement plate 76 (FIG. 2) which is secured to the frames 62 and 64 across each end wall 70 is provided with a laterally projecting, downwardly open hanger 78. The two hangers lie on the centerline of the carrier basket, and are arranged to be pendantly supported by chain attachment pins, not shown herein but described in my aforesaid pending patent application, which are elevated by the chain reaches 26 into engagement with the hangers 78.

General Organization of the Basket Loader

FIG. 4 shows the overall configuration of the basket loader BL, which includes an input conveyor 80 formed of individually driven live rolls 82. From the upstream end portion of the conveyor 80, randomly delivered and oriented upright containers C are fed in the direction of the arrow 84 and pass under an overhead clamp 86. The leading containers subsequently nest in semicircular pockets 88, formed in a pattern bar 90, and come to rest in interspaced alignment along the pattern bar.

When a backlog of containers C extends upstream from the pattern bar 90 beyond the overhead clamp 86, the clamp 86 lowers to engage two transverse rows of cans therebeneath and press them against the rollers immediately below the containers, which rollers are temporarily arrested for the clamping operation. The pattern bar 90 then moves downstream so that the can charge extending between the clamp 86 and the pattern stop bar pockets 88 is isolated from those cans upstream of the two rows clamped by the clamp bar. When the pattern bar 90 is retracted as described, one of the separator plates 74 (FIG. 2) is positioned on the can charge in order to lock the cans together for unitary movement.

The locking together of the can charge is the result of each separator plate 74 being provided with a depending flange 74a along each of its four sides. In order to prevent contact of the bodies of the cans with the flanges 74a, the flanges decline outward from the planar portion of the separator plate. After the separator plate is thus positioned, the pattern bar 90 is further retracted to completely disengage the can charge, and to allow the live rollers 82 to move th charge against a guide bar 92 which lies below the pattern bar 90. At or about the same time, a vertically retractable gate 94 along one common end of the rollers 82 is automatically lowered. Then, a pusher plate 96 which is transversely opposite the gate 94, is actuated by an air operated cable cylinger C1 to sweep toward and past the gate 94 and push the can charge with its separator plate 73 across a dead plate 100, and onto the false bottom plate 73 of the carrier basket CB.

The pusher plate 96 is provided with two vertically spaced, horizontal pusher strips shown in FIG. 7, a vertically adjustable upper strip 97 and a lower, fixed strip 99. The lateral dimension of both pusher strips is such that when the pusher plate 96 moves toward the adjacent filling charge to sweep it to the container basket CB (refer to the phantom line position at the right side of FIG. 7), the pusher plate contacts the flange 74a of the separator plate 74 at the same time the pusher strips 97 and 99 contact the bodies of the adjacent row of containers.

In order to correlate the subsequent description with FIG. 4, that portion of the live roll conveyor 80 upstream of the clamp 86 between lateral support rails 110 and 112 is an accumulator or delivery conveyor section AC in which a backlog of containers are nested together for movement past an interruptable or isolating conveyor section IC located under a clamp mechanism CM, that includes the clamp 86. Between the clamp mechanism and the pattern bar 90 is a pattern forming and transfer conveyor section TC. Above the transfer conveyor section TC, the pusher plate 96 and cable cylinder C1 are part of a sweep arm assembly SA which transfers the assembled charge of containers laterally to the container basket CB. For controlling the movements of the pattern bar 90, it is mounted on a movable platform MP which has elements that may be shifted both longitudinally and transversely of the conveyor 80.

The Input Conveyor Drive

With reference to FIGS. 4 and 8, the live rolls 82 of the accumulator conveyor section AC are powered by a hydraulic motor M1. The interruptable conveyor section IC is powered by a hydraulic motor M2, and the pattern forming and transfer conveyor section TC is powered by a hydraulic motor M3.

Considering first the motor M1, a timing belt and pulley drive train 114 powers a jackshaft 116, which in turn is coupled to timing belt and pulley drive trains 118 and 120 respectively, at each side of the conveyor 80. At the side of the conveyor 90 where the drive train 118 is located, the roll to which the drive train 118 is connected plus alternate live rolls 82 are provided with fixed drive gears 122a. The same ends of the other rolls carry freely rotatable idler gears 122b which are meshed with the drive gears.

At the side of the conveyor where the drive train 120 is located, the roll to which the drive train 120 is connected plus alternate live rolls 82 are provided with fixed drive gears 124a that are meshed with idler gears 124b on the other rolls. In this manner, all of the rolls 82 are positively driven in the same direction from the single drive motor M1 to advance the cans C in the direction of the arrow 84.

Because the interruptable rolls 82 of the isolating conveyor section IC require that they be immobile when the clamp 86 descends to arrest two transverse rows of containers, the drive motor M2 powers only the conveyor section IC and is controlled to be intermittently energized. However, the general drive arrangement is similar to the one just described, in that a belt and pulley drive train 126 is connected to a jackshaft 128 which at opposite ends powers a drive train 130 and 132 at each side of the conveyor section IC. Adjacent the drive train 130, the roll to which the drive train is connected, plus every other roll in both upstream and downstream directions is provided with a fixed drive gear 132a. The same ends of the other rolls carry freely rotatable idler 132b which are meshed with the drive gears.

At the other side of the conveyor, alternate live rolls 82 from the roll to which the drive train 132 is connected are provided with fixed drive gears 134a that are meshed with idler gears 134b on the other rolls, except that the first upstream and the last downstream rolls 82 do not require idler gears because they define the beginning and end of the separate conveyor section IC.

The live rolls 82 of the pattern forming and transfer conveyor section TC are all driven from the same end (the near end shown in FIG. 8) because the gears would otherwise interfere with movement of the containers across the deadplate 100 (FIG. 4). Thus, the motor M3, via a belt and pulley drive train 136, is directly coupled to two drive input shafts, a shaft 138 and a shaft 140. The shaft 138 passes through a freely rotatable idler gear 140b and is coupled to a driven gear 140a on one of the live rolls 82. The shaft 140 is coupled to a driven gear 140a secured to the live roll aligned therewith, and extends beyond the driven gear through an idler gear 140b is positioned between every two adjacent driven gears 140a, with the result that all of the live rolls 82 are rotated in a common direction from the single drive motor M3.

The Clamp Mechanism

The clamp mechanism CM (FIGS. 4 and 5) includes the clamp beam 86 which at each end is secured to a vertical plate 150. Each plate carries two spaced bearings 152 (only one pair being shown) that are slidable upon guide rods 154 which are fixed to the frame of the loader.

In order to raise and lower the clamp beam 86, an upright turnbuckle 156 depends from each end of the clamp beam and is secured to a crank arm 158 on an actuating shaft 160. The shaft 160 is reciprocated by means of a crank 160 that is coupled to a double-acting air cylinder C1. As shown in FIGS. 5 and 6, the underside of the clamp beam 86 carries a resilient pad 166 which contacts the upper ends of the containers C when the clamp beam is in its lowermost position to arrest at least two transverse rows of containers, according to the size of container being handled.

Sweep Arm Assembly

Returning briefly to FIG. 4, it will be noted that the frame of the loader includes two fixed, inverted U-shaped frame members 170. Extending between said frame members, are spaced support channels 172 and 174 (partly broken away) which are parallel to the cable cylinder C1. As best shown in FIG. 6, vertically spaced angle bars 176 are mounted within the channel 172 and 174 to form guide tracks for a movable carriage 180 which is a part of the sweep arm assembly SA. as clearly shown in FIGS. 4 and 5, the carriage 180 includes a U-shaped platform 182 having laterally projecting wheels 184 supported by the lower tracks 176 for movement between the FIG. 4 position with the pusher plate 96 remote from the carrier basket CB, to a projected position, not shown, wherein the pusher plate is near the far end of the deadplate 100.

The cable cylinder C1 (FIGS. 4 and 5) is provided with end brackets 186 secured to the frame members 170, and is a commercially available unit which provides a power stroke substantially coextensive with the cylinder. Thus, the cylinder is provided with a piston which is connected to a cable 188 that extends in both directions through the cylinder, and is trained over an end pulley 190 in each of two end brackets 192 that anchor the cable cylinder to the U-shaped frame members 170. The ends of the cable 188 are anchored to a channel 194 which is fixed to the platform 182, thereby carrying the pusher plate 96, as previously described, when the cable cylinder 98 is energized, to transfer an assembled charge of containers from the transfer conveyor section TC to the container basket CB, and to return the pusher plate from the container basket back to its FIG. 4 retracted or start position.

Before the pusher plate is returned to its start position, means are provided to elevate the pusher plate above the level of any incoming containers being conveyed from the clamp arm 86 toward the pattern bar 90, so that the containers need not be held back while the pusher plate 96 is retracted. For this purpose, the pusher plate 96 (FIG. 6) is secured to a tube 196 that is mounted between ears 198 that depend from the carriage 180 and retain a pivot pin 200. Connected to the tube 196 is a crank arm 202 which extends upward through the platform 182 (FIG. 5) and is coupled to an air cylinder C3 mounted on the platform. The air cylinder C3 is of the double-acting type and is provided with connecting hoses, not shown, which allow free movement of the carriage. When the carriage is in the other extreme of movement from the position shown in FIG. 5, the cylinder C3 is energized to retract its piston rod and swing the pusher plate 96 to a substantially horizontal position which will clear any containers therebeneath when the carriage returns to its FIG. 5 position, following which the cylinder is energized to project its piston rod and return the pusher plate to an upright, pushing position.

Operating Functions

As mentioned earlier, one of the operating functions that must take place before the pusher plate 96 (FIGS. 5 and 6) can be actuated to transfer the assembled charge of containers and its overlying separator plate 74 to the carrier basket CB, is that the pattern bar 90 must be further retracted downstream so that containers seated in the pockets 88 are released for movement toward the carrier basket. This is accomplished by the movable platform MP. It should be noted that a first retracting movement of the pattern bar 90 separates one filling charge of containers from the containers held back by the clamp bar 86 so that the separator plate 74 can be placed on the charge. The second retracting movement allows the container charge to be ejected to the carrier basket CB. Another operating function which must be carried out prior to transferring the container charge to the carrier basket, is that the gate 94 must be lowered beyond the upper surfaces of the live rolls forming the transfer conveyor section TC.

The Pattern Stop Bar

In the case of the pattern bar 90 (FIGS. 6 and 7) the platform MP for shifting the pattern bar comprises a box-like frame 210 having a horizontal guide bar 212, on each side, which extends through a plurality of fixed bearings 214 (only two being shown). An air cylinder C4 (FIG. 6) is secured coaxially to an air cylinder C5, and the cylinders lie in the plane of, and intermediate, the guide bars 212. As presently described, the pattern bar 90 is indirectly secured to the slidable frame 210 for the two previously mentioned movements longitudinally of the conveyor 80, and is also mounted for movement transversely of the conveyor. The air cylinders C4 and C5 (FIG. 6) have their base flanges bolted together so that their piston rods 216a and 218a project in opposite directions. A pivot pin 216b connects the piston rod 216a to a fixed frame bracket 220, and a pivot pin 218b connects the piston rod 218a to a bracket 222 on the frame 210. By sequentially energizing the air cylinders, beginning with the air cylinder C4, the frame 210 moves from its initial phantom line position 210a, when the air cylinder C5 is energized, to the full line position shown. In the phantom line position 210a, the pattern bar 90 is in the phantom line position 90a. With the air cylinder C4 still energized and the pattern bar 90 in the full line position which is shown, energization of the air cylinder C5 moves the frame 210 to the phantom line position at 210b, and thus moves the pattern bar 90 to the phantom line position 90b. The three positions of the pattern bar, 90a, 90 and 90b, respectively correspond to the functions wherein (1) the downstream transverse row of containers of one assembled filling charge is initially stopped, (2) the filling charge is allowed to move downstream until said row contacts the guide bar 92 and one of the separator plates 74 is positioned on the charge to lock the assembled containers together, and (3) the pattern bar is retracted to clear the containers in said row so that the pusher plate 96 can transfer the filling charge to the container basket.

It was earlier mentioned that the pattern bar 90 is also mounted for selective endwise movement, the reason for which is next described. FIG. 9 illustrates a nested group of containers, forming a filling charge F1, wherein the containers are smaller in diameter than the containers shown in FIG. 10 for a filling charge F2. Both filling charges F1 and F2 must fit within the same size of container basket CB and under the same size of separator plate 74, but the numbers of containers in the filling charges F1 and F2 is not only different, their patterns are also significantly different.

Thus, the trailing configuration of the filling charge F1 results from the clamp bar 86 arresting a transverse row R1 wherein the containers are not in longitudinal alignment with pockets 88 in the pattern bar 90. Accordingly, when the FIG. 9 pattern is repeated, the pattern bar 90 must be moved endwise a distance equal to half the distance between the pockets 88. Conversely, when the FIG. 10 pattern is repeated, the pattern bar 90 does not require repositioning because the pockets 88 are already aligned with the next incoming transverse row of containers.

Referring to FIGS. 5-7, the mechanism for selectively shifting the pattern bar 90 endwise includes a double acting air cylinder C6, secured by mounting pads 232 to the frame 210, and having opposed piston rods 234 actuated by a common piston. An upstanding U-shaped mounting yoke 236 on the end of each piston rod has legs projecting upwardly through slots in the upper wall 238 of the frame 210 and secured to a shiftable table 240. As shown in FIG. 6, the pattern bar 90 is removably mounted by screws 242 to the table 240, and the table is provided with a depending rail 244 which runs in bearing blocks 246 (FIG. 7) that are fixed to the upper wall 238. By means of adjustable stops, not shown, to limit the endwise movement of the table 240 when the air cylinder C6 shifts the table and the pattern bar carried thereon, the pockets of the pattern bar for the pattern shown in FIG. 9 are shifted each time a filling charge F1 is formed, in the manner and for the purpose already described. When the FIG.

10 pattern is repeated, the air cylinder C6 maintains the pattern bar 90 in the same position.

The Retractable Gate

FIGS. 5–7 disclose the operating components of the retractable gate 94 which lies between the transfer section TC (FIG. 4) of the conveyor 80, and the deadplate 100. When the gate 94 is in its FIG. 6 elevated position, it forms an edge guide for the incoming containers C, and is lowered prior to the pusher plate 96 ejecting the assembled filling charge over the deadplate to the container basket. Thus, the upper edge of the gate 94 is provided with an upstanding finger 250 between each pair of adjacent live rolls 82, and is vertically movable by an air cylinder C7. For the latter purpose, the piston rod of the air cylinder is coupled to a horizontally movable actuating link 254 having slotted portions slidable on fixed guide studs 256 which project from a box rail 258 (FIG. 7).

In turn, the link 254 carries camming pins 260 engaged with inclined slot portions 262 of a support angle bar 264. The angle bar 264 is guided for vertical movement by fixed guide studs 266 that extend through vertical slots in the angle bar and are fixed to the box rail 258. Because the longest dimension of a filling charge of containers varies according to the size of cans, the gate 94 is laterally adjustable (toward and away from the deadplate 100). Thus, the gate is provided with a base flange 268 which is secured by bolts 269 to the angle bar 264. As shown in FIG. 5, the angle bar 264 is slotted to receive the bolts 269 so that the gate 94 can be adjusted relative to the size of the assembled filling charge, as mentioned in connection with the different patterns and can sizes shown in FIGS. 9 and 10. It should be noted that a guide rail 267 (FIG. 4) along one side of the inlet end of the conveyor 80 is adjustably mounted, by means not shown, for alignment of the guide rail with the adjusted position of the gate 94.

Separator Plate Depositing Mechanism

Means for placing one of the separator plates 74 (FIG. 6) on an assembled filling charge includes four vertical hanger plates 270 (FIG. 5) which are bolted to the support channels 172 and 174, and are slotted for vertically adjustable positioning according to the height of the cans being handled. As shown in FIG. 6, the separator plate 74 is held closely above the cans C by confronting angle bars 272 and 274 which swing downward and away from each other to release and deposit the separator plate on the assembled filling charge. Air cylinders C8 and C9, respectively, operate the angle bars 272 and 274. Thus, the angle bar 274 is secured to arms 276 that project inwardly from a shaft 278 which is rotatably supported in bearings 280 on the lower ends of the adjacent hanger plates 270. A crank arm 282 couples the shaft 278 to the air cylinder C9, the latter being mounted on one of the hanger plates. In like manner, the angle bar 272 is secured to arms 282 on a shaft 284 which is mounted in bearings 286 on the other two hanger plates 270. A crank arm 288 on the shaft 284 is connected to the air cylinder C8, the air cylinder being fixed to one of the hanger plates 270. With the described arrangement, retraction of the piston rods of the air cylinders C8 and C9 swings the angle bars 272 and 274 downward to place the separator plate 74 on the filling charge, following which the pusher plate 96 ejects the filling charge before the air cylinders return the angle bars to the position shown in FIG. 6. In the present embodiment of the invention, the separator plates 74 are manually slid into place on the angle bars when the pusher plate 96 has ejected the filling charge and the angle bars are swung upward. Since the pusher plate is swung upward to a horizontal position for its return stroke, this, plus the return stroke of the pusher plate, leaves ample time and clearance for placing a separator plate on the angle bars before the pusher plate is swung into pushing position. When the separator plate 74 is in place on the filling charge, its depending flanges 74a lock the charge together for unitary movement when the pusher plate 96 ejects the filling charge.

Operational Sequence and Controls

As schematically shown in FIG. 11, the elevator platform 77 may be elevated and lowered in conventional manner by a fluid-operated cylinder C10, which in the initial stage of an operational sequence places the false bottom plate 73 of an empty container basket CB in horizontal alignment with the deadplate 100. At this time, the pattern bar 90 is in its furthest upstream position, the gate 94 is in its raised position, the pusher plate 96 is upright and in its retracted position, and the clamp bar 86 is in its uppermost position. All of the conveyor rolls 82 are being driven to move the randomly delivered incoming cans C into engagement with the pattern bar 90. Some of the cans will directly enter the pattern bar pockets 88, while others will laterally shift, or be shifted by, other cans. Due to the low dynamic friction between the cans and the live rolls, lateral movement is coincidental with forward movement, in other words, the cans "flow" into position rather than being impacted.

FIGS. 11–19 show the preferred operating sequence and are best understood with simultaneous reference to FIG. 20, which shows the various air cylinders already described, and with reference to the chart of FIG. 21 which tabulates the operating sequence.

Preliminarily, it should be mentioned that a program controller PC (FIG. 20) is coordinated with the operation of the hydrostatic cooker HC (FIG. 1) by conventional means, not shown, to operate the air cylinders in timed relation to the cooker. Since the program control PPC may take various forms, according to preference, it is not specifically described or shown in detail. A suitable program control, for example, may be a Mead Multiple Circuit Programmer manufactured by Mead Fluid Dynamics, 4114 North Knox Avenue, Chicago, Illinois 60641. The program control unit PC incorporates a pneumatic motor driving a cam shaft having an adjustable cam for each of a plurality of valves. Each valve, in turn, controls one of the air cylinders C1–C10. Thus, the unit PC is provided with an air inlet conduit 300, and various outlet conduits 302 as required to individually operate the air cylinders and the intermittently operated air motor M2 (FIG. 8).

With reference to FIGS. 12, 20 and 21, the incoming cans C build up against the pattern bar 90 until they extend upstream behind the clamp bar 86. After the backlog of cans comprising a complete pattern, sensing means (illustrated schematically as a photoelectric sender and receiver 304) signals the program control unit PC to stop the air motor M2 (FIG. 8) and thus deenergize the live rolls 82 of the interruptable conveyor section IC under the clamp beam. At the same time, the control unit PC extends the piston rod of the air cylinder C2 and lowers the clamp beam 86 onto the cans C beneath the clamp beam. As shown in FIGS. 6 and 9, the downstream edge of the clamp beam contacts the transverse can row R1 at about the center, and the cans of row R1 are not in longitudinal alignment with the pockets 88 in the pattern bar 90. Thus, when the cans of row R1 are later released, the pattern bar 90 must be shifted endwise to align the pockets 88 with the cans. Meanwhile, the next operating step shown in FIG. 13, is to shift the pattern bar 90 downstream to separate the filling charge F1 of cans from the program control PC extending the piston rod of the air cylinder C4 (FIG. 21). The pattern bar is thereby moved to the position shown in full lines in FIG. 6, and the downstream, transverse row of cans is eased into contact with the guide bar 92. However, the pockets 88 of the pattern bar 90 are still engaged with the cans, and the pattern bar must be further retracted before the filling charge F1 can be ejected. By temporarily retaining the filling charge, one of the separator plates 74 can now be positioned thereon so that its depending flanges 74a lock the filling charge together for unitary movement.

With reference to FIGS. 14, 20 and 21, the separator plate 74 is positioned on the filling charge F1 as the program control PC energizes the air cylinders C8 and C9 to retract their piston rods. The separator plate was previously manually placed on the angle bars 272 and 274 (FIG. 6). The cylinders C8 and C9 are maintained in retracted positions until the filling charge is later ejected.

The next operation is to further retract the pattern bar 90 in order to disengage its pockets 88 from the cans and allow the pusher plate 96 to sweep the filling charge into the false bottom plate 73 of the carrier basket CB. The charge is now brought against the guide bar 92. This operation is shown in FIG. 15. Thus, the air cylinder C5 (FIG. 20) is energized by the program control PC to extend its piston rod and move the platform MP (FIG. 6) and the pattern bar attached thereto away from the filling charge.

Next, as shown in FIG. 16, the gate 94 is lowered below the bottoms of the cans to clear the ejection path toward the container basket. For this purpose, the program control energizes the air cylinder C7 (FIGS. 6 and 20) in a direction extending its piston rod to cam the gate 94 down. It will be noted that up to this point, all of the previously actuated air cylinders C1–C7 remain in their individual positions described. The filling charge F1 is now ready for transfer by the pusher plate 96 to the container basket CB.

Thus, as shown in FIGS. 17, 20 and 21, the cable cylinder C1 is actuated by the program control PC in a direction to carry the pusher plate 96 from its FIG. 16 retracted or start position, to the position shown in FIG. 17 wherein the filling charge F1 is placed into the elevated false bottom plate 73 of the container basket CB.

Several operational steps may now take place simultaneously, as follows:
1. The gate 94 may be raised.
2. The filling charge F1 may be lowered to place the separator plate 74 in the position formerly occupied by the false bottom plate 73.
3. The pusher plate 96 may be pivoted to a horizontal position to clear incoming cans during its return movement.
4. The pattern bar 90 may be shifted endwise so that its pockets 88 are aligned with the next row R1 of cans.
5. The pattern bar 90 may be returned to its initial upstream position.

All of the above listed steps are shown either completed, or being completed, in FIG. 18. Thus, the air cylinder C7 (FIG. 20) is energized to retract its piston rod and raise the gate 94. The air cylinder C10 is energized to retract its piston rod and lower the filling charge until the separator plate 74 and the deadplate 100 are coplanar. Pusher plate 96 is swung to a horizontal position by retracting the piston rod of the air cylinder C3. The pattern bar 90 has been shifted endwise by actuating the air cylinder C6, and moved upstream to its starting position by retracting both piston rods of the air interconnected cylinders C4 and C5.

When the pusher plate 96 returns to its FIG. 19 position, the air cylinder C3 is again actuated to swing the pusher plate vertical, and the above described steps repeat. It will be apparent that the program control PC (FIG. 20) starts the interruptable conveyor rolls IC under the clamp beam for the next operating cycle.

From the preceding detailed description of the present basket loader invention, it is believed evident that one important aspect is the provision of separator plates 74 having downturned edge flanges 74a, and the concept of locking together each assembled filling charge of cans with an overlying separator plate prior to the transfer of the filling charge to the container basket. This enables the filling charge to be transferred with a minimum of mechanical guidance (only the pusher plate 96 and the edge guide 92 are required) so that the probability of can damage is minimized. Another important feature is the selectively shiftable pattern bar 90, and its cooperative relation with the clamp beam 86, to adapt the basket loader BL to handle a variety of different can sizes, even though different can sizes result in different edge configurations as exemplified in the FIG. 9 and FIG. 10 patterns. The live roll conveying means is also important to the rapid accumulation of each filling charge, due to the dynamic, line-contact friction between the live rolls and the cans.

A further important feature of the present invention is that partial filling charges can be assembled and transferred without any adjustments or auxiliary apparatus. Thus, if at the end of a production run there are not enough cans for forming a complete tier, the partial tier does not adversely affect any of the operating functions. The reasons for this are that the dynamic friction between the live rollers 82 and the cans C allows the cans to freely move about in lateral directions, and that the separator plate flanges 74a confines the cans to the area defined by the flanges. Accordingly, if less than the usual number of cans build up behind the pattern bar 90, but the number is sufficient to support a separator plate 74, as soon as the pusher plate 96 begins to eject the separator plate (note that the pusher plate need not initially push the cans) the cans are overtaken by the separator plate and automatically nest together near the pusher plate. A further important aspect of this capability is that the cans are thus rearranged symmetrical about the path of the pushing movement, and that this path coincides with the longitudinal center of both the carrier basket CB and it hanger brackets 78 (FIG. 2). Thus, the significant weight of even a partial tier of cans will not upset the swinging balance of the carrier basket when it is later supported in the cooker HC by the brackets 78.

FIG. 22 schematically illustrates a basket unloading system BU which includes structure for automatically separating the containers and the separator plate 74 which overlies each tier T of containers C that have been processed in the container basket CB. As in the basket loader structure previously described, the basket unloading system BU includes carrier chains 318 for placing the loaded container basket CB over a hydraulic cylinder 320 which raises and lowers a platform 322 that is movable into supporting engagement with the false bottom plate 73 of the container basket. Each tier of containers is positioned, in turn, by the cylinder 320 just above the upper edge of the container basket where it can be laterally transferred to a takeaway conveyor 324 at a lower elevation than the tier. Intermediate the takeaway conveyor and the container basket is a declining deadplate 326.

When a tier T of containers has been elevated above the container basket CB, a pusher plate 328 in pushing alignment with the tier T and the separator plate 74 is actuated by a cable cylinder 330 to sweep across the container basket CB and the deadplate 326 to the close edge of the conveyor 324, thus transferring the entire tier onto the conveyor. Mounted above the conveyor and deadplate are two spaced slide rails 332 that are horizontally aligned with the opposed long edge portions of the separator plate 74. Thus, the separator plate slides into, and is supported by, the slide rails 330, while the containers C slide down the deadplate and are lowered away from the separator plate. From the slide rails 330, the separator plates may be manually removed and stacked for reuse in the basket loading system previously described. The special utility of the basket unloading system, besides its simplicity, is that two or more unloaders BU can be mounted side by side to increase the unloading rate.

Although the best mode contemplated for carrying out the present invention has been herein shown and described, it will be apparent that modification and variation may be made without departing from what is regarded to be the subject matter of the invention.

I claim:

1. Container handling apparatus for assembling a pattern for containers and transferring the assembled pattern into a receptacle, said apparatus comprising a conveyor having a container delivery section and a pattern forming section, a receptacle at one side of the conveyor pattern forming section, a pocketed pattern bar mounted at the delivery end of the pattern forming section for arresting containers on the conveyor, means for temporarily arresting a transverse row of containers on said conveyor delivery section to form a pattern of containers on the pattern forming section, a separator plate having peripheral downturned flanges for confining the pattern, means for depositing said separator plate on said pattern of containers, means for moving said pattern bar clear of the pattern of containers, and ejector means for engaging the separator plate and pushing the plate and the pattern of containers transversely off the pattern forming section of said conveyor and into said receptacle.

2. In a container handling apparatus for assembling containers into a nested pattern, a continuously driven live roll conveyor for moving upright cylindrical containers along a given path, a pattern bar extending transversely across said path, said pattern bar having a row of aligned spaced pockets to arrest a first row of containers in position for subsequent rows to nest together, means for temporarily stopping a transverse row of containers upstream from said pattern bar, means for moving said pattern bar longitudinally of said conveying path to isolate a nested charge of containers from the arrested containers, the row of containers temporarily stopped upstream of said pattern bar being longitudinally offset from the row of containers arrested by said pattern bar, means for moving said pattern bar to disengage the latter containers, means for ejecting the charge of containers, means for shifting said pattern bar endwise to align said pattern bar pockets with the row of temporarily stopped containers, said ejecting means including an air cylinder, a pusher plate driven by said air cylinder in a pushing stroke and a retracting stroke normal to said conveying path, means mounting said pusher plate for movement from a substantially vertical position during said pushing stroke to a substantially horizontal position above the upper ends of the containers during said retracting stroke, and means connected to said pusher plate for respectively vertically and horizontally positioning said pusher plate during said pushing and retracting strokes, said live roll conveying means including a plurality of interruptable rollers extending across said conveying path, and wherein said container stopping means comprises a transverse clamp bar vertically movable over said interruptable rollers, means for sensing a backlog of nested containers extending upstream of said clamp bar, and control means responsive to said sensing means for stopping said interruptable rollers and lowering said clamp bar against the containers thereon.

3. Apparatus according to claim 2, and means supporting a container basket laterally adjacent said conveying means for receiving said container charge, and a vertically movable gate mounted along the adjacent side of said conveying means, said gate comprising a serrated plate having upstanding fingers interdigitated with said conveyor rollers, and power means connected to said gate for elevating said fingers above the plane of said rollers to assemble said container charge and for lowering said fingers below the plane of said rollers to eject said container charge.

4. Apparatus according to claim 3, wherein said means for moving said pattern bar includes a movable platform carrying said pattern bar, two coaxially connected cylinders with their piston rods extending in opposite directions, means anchoring one of said piston rods, means connecting the other of said piston rods to said carriage, and means for sequentially extending said piston rods from their respective cylinders to provide a two-stage downstream movement of said carriage and said pattern bar, the first to isolate the container charge from the arrested upstream containers while retaining engagement with the pattern bar, and the second to disengage the pattern bar from the isolated container charge for its subsequent transfer.

5. Apparatus according to claim 4, and an edge guide mounted across said conveying path adjacent the plane of said pattern bar, said pattern bar being moved downstream in the first of said two stage movements of said carriage and said pattern bar a distance sufficient to ease the downstream transverse row of containers in said container charge into contact with said edge guide.

6. Apparatus according to claim 5, and a rectangular separator plate having downturned edge flanges, said separator plate having inside dimensions between opposed flanges slightly larger than the assembled charge of containers, and means for depositing said separator plate on the container charge at the termination of the first of said two stage movements of said carriage and said pattern bar.

7. Container handling apparatus for assembling a pattern of containers and transferring the assembled pattern into a receptacle, said apparatus comprising a container conveyor, said conveyor having a container delivery section that terminates in live roll isolating section and a live roll pattern forming section following said isolating section, drive means for said conveyor delivery and pattern forming section and separate drive means for the isolating section, said receptacle being at one side of said pattern forming section, a pocketed pattern forming bar mounted at the delivery end of said pattern forming section, means for clamping a transverse row of containers on said isolating section after formation of a pattern, means for interrupting the drive means to said isolating section during clamping, means for moving said pattern bar clear of the pattern means for pushing the pattern transversely off said pattern forming section to transfer the pattern into said receptacle, and a gate having fingers that project up between the rolls of said pattern forming section during pattern formation, said gate being longitudinally disposed along the receptacle side of said pattern forming section, and means for lowering said gate during pattern transfer.

* * * * *

UNITED STATES PATENT OFFICE
CERTIFICATE OF CORRECTION

PATENT NO. : 3,978,970
DATED : September 7, 1976
INVENTOR(S) : JAMES L. REIMERS

It is certified that error appears in the above-identified patent and that said Letters Patent are hereby corrected as shown below:

Col. 2, line 60, after "thus" change "retared" to -- retarded --.

Col. 5, line 64, change "in" to -- is -- (first occurrence).

Col. 6, line 61, change "cylinger" to -- cylinder --.

Col. 7, line 67, after "idler" insert -- gears --.

Col. 8, line 38, change "C1" to -- C2 --.

Col. 12, line 46, change "PPC" to -- PC --.

Col. 14, line 66, change "it" to -- its --.

Signed and Sealed this fifth Day of July 1977

[SEAL]

Attest:

RUTH C. MASON
Attesting Officer

C. MARSHALL DANN
Commissioner of Patents and Trademarks